Oct. 23, 1962

L. URMENYI 3,059,934

PICK-UP ARM

Filed May 22, 1958

2 Sheets-Sheet 1

Laszlo Urmenyi

Oct. 23, 1962 L. URMENYI 3,059,934

PICK-UP ARM

Filed May 22, 1958 2 Sheets-Sheet 2

Laszlo Urmenyi

United States Patent Office 3,059,934

Patented Oct. 23, 1962

3,059,934
PICK-UP ARM

Laszlo Urmenyi, 18 Ernle Road, London, England

Filed May 22, 1958, Ser. No. 737,175
Claims priority, application Great Britain May 23, 1957
5 Claims. (Cl. 274—23)

Pick-ups suffer generally from two defects, which introduce distortion in the sound reproduction from records and cause excessive record wear. One such defect is called tracking error, the other is side pressure. Tracking error is due to the fact, that the axis of the pick-up armature is not exactly tangential to the mean line of the record grooves across the whole disc. To reduce this error to a minimum, pick-up arms are made with and offset angle, which means, that the armature axis about which the stylus rocks does not point to the axis of the swivelling arm but there is an angle between the armature axis and the horizontal line connecting the stylus point and the axis of the arm. This offset angle is then the cause of side pressure. The frictional force acting from the record groove on the stylus point is tangential to the mean line of the record groove and since this line, due to the offset angle, does not go through the axis of the arm, a torque is introduced forcing the arm clockwise, view from above.

The object of the present invention is to provide means whereby both tracking error and side pressure are eliminated.

According to the invention the axis of the pick-up arm is arranged to cross the theoretical line which is the straight continuation of the armature axis, thereby eliminating side pressure and the axis of the pick-up arm is made to move automatically on a predetermined path in such a way, that the distance between the pick-up arm axis and the turntable axis, becomes variable and dependent on the momentary distance between stylus point and turntable axis as the record is played, in such a manner that the armature axis remains essentially tangential to the mean record groove in which the stylus happens to be at any time thereby eliminating tracking error or reducing tracking error to a negligible amount.

Figure 1:
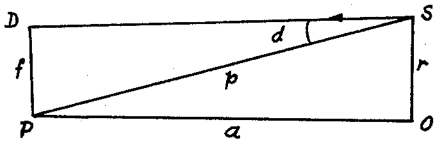
Figure 2:
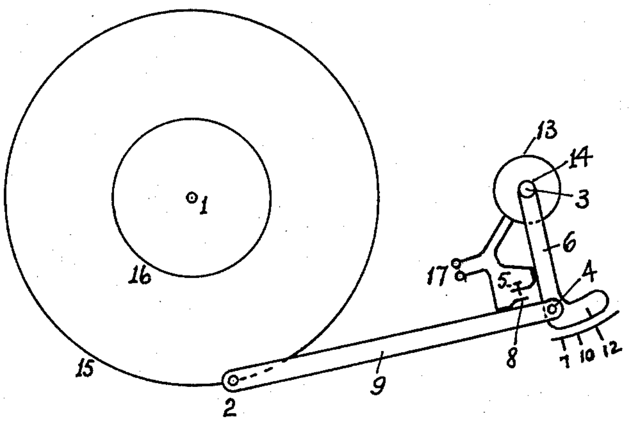
Figure 3:
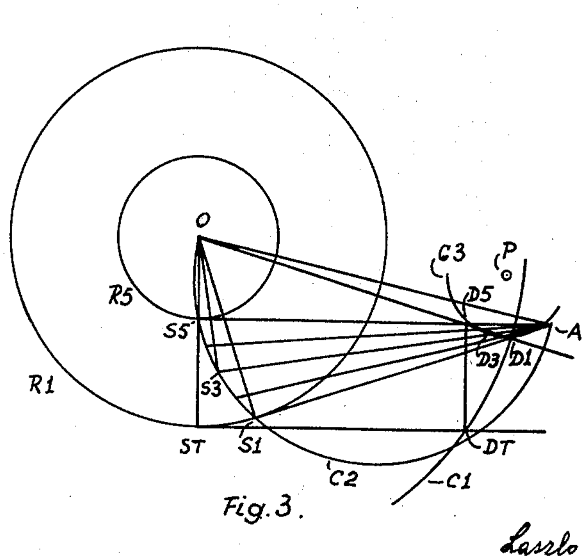
Figure 4:
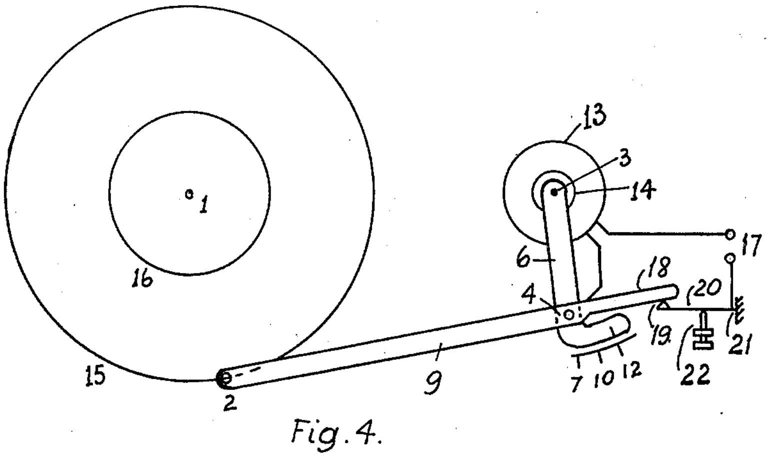
Figure 5:
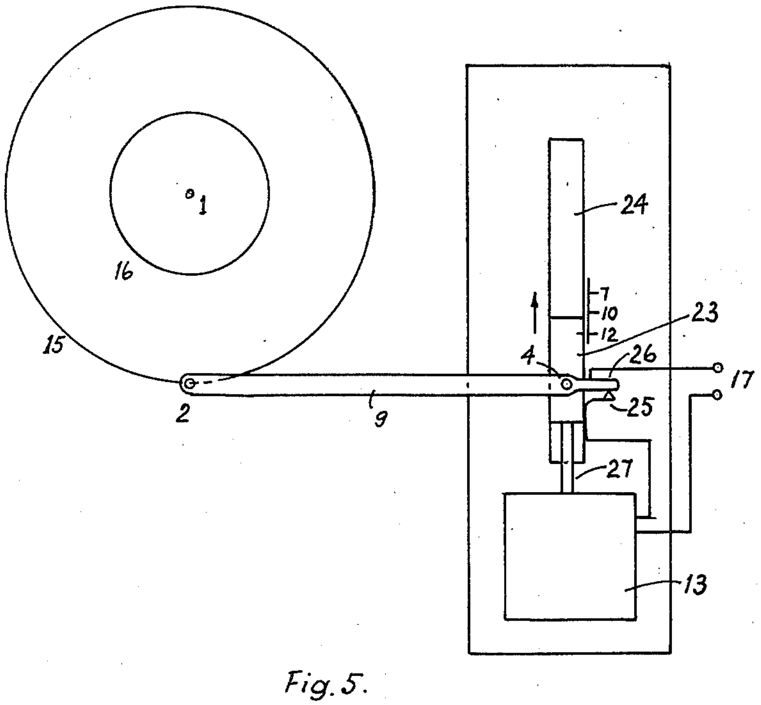

The invention will now be described more fully by the way of examples with reference to the accompanying drawings, in which FIG. 1 is a diagram illustrating the geometrical principles of conventional pick-up arm design and the derivation of the first example of the invention therefrom, FIG. 2 shows an example of the invention, with reference to its derivation from FIG. 1, FIG. 3 shows the geometrical construction of a further example of the invention, FIG. 4 shows an example of the invention with reference to FIG. 3, FIG. 5 shows a further example of the invention.

Referring to FIG. 1, O is the record centre, i.e. the turntable axis, P is the back pivot of the carrying arm, S is the stylus, $p$ is the distance between S and P, $a$ is the distance between P and O. The axis about which the stylus rocks is indicated by an arrow and is along SD, enclosing the angle $d$ with the line SP. The angle $d$ is called the "offset angle." PD ($=f$) is a perpendicular from P on to the line SD and is known as the "linear offset." By correct choice of the values for $p$, $a$, $d$ and $f$, the tracking error can be kept below 2°. In the optimum case therefore the angle between lines OS and SD will be between 88° and 92°.

It will be appreciated, that this arrangement introduces a considerable side pressure. The frictional force acting from the record groove on the stylus is in the direction of the tangent to the mean groove and therefore essentially in the direction of the lines DS (+2°) pointing away from D and thereby causing a clockwise torque on the carrying arm. If this frictional force is called $b$, the torque is $f \times b$ and the side pressure on the groove $$\frac{f}{a} \times b$$

According to one example of the invention, the carrying arm may consist of two parts, one being the part PD to be called the pick-up arm, the other the part DS to be called the positioning arm, pivoted both at D and at P. It is clear, that no torque can be produced by the frictional force acting on the stylus, since the direction of this force passes through the pivoted point D. Means may be provided (e.g. a small geared motor) to rotate part PD so that it always stays at a right angle to part DS, thereby ensuring, that the tracking error is kept within the same limits as a conventional pick-up arm of identical dimensions.

Referring now to FIG. 2, 1 is the record centre, 2 is the stylus, 15 is the first groove of the record, 16 is the last groove, 9 is the pick-up arm pivoted at 4 on positioning arm 6, 5 is an adjustable contact mounted on positioning arm 6, 8 is a fixed contact mounted on pick-up arm 9. The scale numbered 7, 10 and 12 refers to the correct setting of arm 6 for the first groove of 7", 10" and 12" records respectively. A geared motor 13 is connected to spindle 3 via a slipping clutch 14. Sufficient torque can be transmitted via the slipping clutch to spindle 3 to move arm 6 or to keep arm 6 in a fixed position when the geared motor is not running, but arm 6 may also be moved manually against the friction forces of the slipping clutch. Contacts 5 and 8 are in series with the power supply 17 to the geared motor 13. In operation, e.g. when a 12" record is played, the arm 6 is set into the position marked 12 and the stylus is placed on the record. Contacts 5 and 8, if correctly adjusted, are just making and the geared motor starts moving arm 6 slowly clockwise. The gears are conveniently chosen so that the speed of rotation of arm 6 is slightly greater than necessary to keep the contacts closed as arm 9 is moving towards 1. Therefore the contacts will soon break the circuit and the motor slows down but soon contact is made again and the arm 6 follows with just sufficient speed to keep the right angle with arm 9. To avoid interference due to arcing at the contacts, a suitable suppressor may be used. If required, a relay may be energized via contacts 5—8, the motor circuit being opened and closed by the said relay. Instead of completely breaking the motor circuit, means may be provided to slow down the motor when contacts 5—8 are broken.

It is of course not at all necessary to follow the geometrical principles of FIG. 1, once the distance between the pick-up arm axis D and the turntable axis O is made variable. FIG. 3 shows another possible way of geometrical design, this being a further example of the invention. O is again the record centre, R1 is the first groove of the record, R5 is the last groove of the record, S1, S3 and S5 indicate the initial, an intermediate and the final positions of the stylus respectively as the record is played (intermediate positions S2 and S4 are not marked to avoid overcrowding the drawing). D1, D3 and D5 are corresponding positions of pivoted point D, P is the centre of rotation of arm PD. The design has been arrived at in the following manner. To the line O—S5 the perpendicular S5—D5 is drawn, the latter representing the position of the pick-up arm when the last groove of the record is played. Then line ST—DT is drawn parallel to S5—D5 and tangential to the first groove R1. Then a circle C1 is drawn through point DT with centre O. The position of pick-up arm axis D could be chosen any-where on circle C1 for zero tracking error when the stylus is in the groove R1. For minimum movement of D, the line O—D5 is drawn and extended until it cuts circle C1 in point D1 and this latter point is chosen as the initial position for axis D. From line D1 the tangent D1—S1 to circle R1 is drawn. The lines S1—D1 and S5—D5 cut at point A. Now line OA is drawn and circle C2 constructed on OA as diameter. Intermediate lines A—S3 and O—S3 are drawn. Since point S3 is on the circumference of circle C2, lines O—S3 and A—S3 are at right angles. Now the distance S5—D5 (which is the length of the pick-up arm) is measured from S3 on the line S3—A and point D3 is obtained. Then the circle C3 with centre P is constructed, being a circle which passes through the three points D1, D3 and D5. From the method of construction it is clear, that when the pick-up arm is in the positions S1—D1 or S3—D3 or S5—D5, the tracking error is zero. To test intermediate points two more lines have been drawn from point A and the distance S5—D5 measured on these lines from the points where they cut circle C3. It is found, that the points thus found lie almost exactly on circle C2 and accurate measurements confirm, that if the pick-up arm is moved in such a way, that its axis D moves on circle C3 whilst the straight continuation of the theoretical line which connects the stylus point S with D goes always through point A, then the tracking error will be less than ½° across the whole record. Thus this construction is better than the one illustrated in FIGS. 1 and 2 as far as tracking error is concerned. In practice, a straight contact strip may be fixed to the pick-up arm representing the line D5—A in FIG. 3 and a fixed contact mounted at A and the making and breaking of the contact at A utilized the same way as in FIG. 2 to rotate the spindle at P with the aid of a geared motor and slipping clutch. In this way, a pick-up arm design is obtained with zero side pressure and a tracking error of less than ½°. It is possible to eliminate even the last remaining ½° of tracking error by suitably bending the said contact strip. It will be noticed, that whilst in the example of FIG. 2 both contacts are moving, in the example of FIG. 3 one of the contacts, which is fixed at A, is stationary.

Referring to FIG. 4, 15 and 16 are the first and last groove of the record respectively, 1 is the centre of the turntable, 2 is the stylus, 9 is the pick-up arm pivoted at 4, 6 is the positioning arm pivoted at spindle 3, 13 is an electric motor, 14 is a slipping clutch, 18 is a contact strip mounted on the pick-up arm, 19 is a stationary contact mounted on fine metal strip 20 which is mounted at 21 in a fixed relative position to the turntable, 22 is an adjusting screw for accurate adjustment of the position of contact 19, 17 are the points to be connected to the electric power supply. The geometrical position of the various components in this example is as described with reference to FIG. 3. Whilst contact strip 18 is straight in the drawing, it may be slightly bent in order to eliminate completely the tracking error.

In the above examples of the invention a circular path was chosen for the axis D of the pick-up arm. This is of course the easiest to obtain in practice. But any curved path may be chosen, e.g. by using a cam, as long as the arrangement is such, that the tracking error is kept to a minimum.

One further example of the invention is obtained by moving the pick-up arm axis along the straight line DT—D5 (see FIG. 3), in such a way, that the pick-up arm stays always parallel to the line ST—DT and therefore the stylus point moves along the line ST—S5. It will be appreciated, that this way the tracking error is kept zero for all positions of the pick-up arm.

This latter example is shown in FIG. 5, in which 15 and 16 are the first and last groove of the record respectively, 1 is the centre of the turntable, 2 is the stylus, 9 is the pick-up arm pivoted at 4, 23 is a sliding member, 24 is a guide adapted to take the said sliding member, 13 is a geared motor, 25 is an electric contact fixed on sliding member 23, 26 is an electric contact fixed on arm 9. The power supply is connected at 17. 27 is a screw-threaded spindle adapted to move sliding member 23 in the direction of the arrow, when the motor is running. Means, not shown, may be provided to disengage the screw-threaded spindle, allowing the sliding member to be moved to any desired initial position. A great variety of such means is known, e.g. a spring loaded lever, which carries a segment of a nut, which normally engages the screw-threaded spindle, but when the lever is depressed against the spring, the nut segment is lifted out of engagement with the screw-threaded spindle. The scale marked 7, 10 and 12 is provided to indicate the correct initial position for different size records.

What I claim is:

1. Pick-up device comprising a pick-up arm for the support of a pick-up having a stylus adapted to reproduce the frequency intelligence of a record in contact with the said stylus, the said pick-up arm being pivoted in an axis at right angles to the plane of the record, a movable member on which the said arm is mounted, electrical means adapted to move progressively the said movable member on a circular path without exerting a torque on the pick-up arm, electric contacts, means to operate said electric contacts, said means being mounted on the said pick-up arm and adapted to operate said contacts when a predetermined relative angular position between the pickup arm and the tangent to the mean record groove at the stylus point is reached, the said electric contacts being adapted to control the progressive movement of the said movable member by the said electrical means.

2. Device according to claim 1 in which one of the said contacts is mounted in a fixed relative position to the pick-up arm and the other of the said electric contacts is mounted in a fixed relative position to the turntable axis.

3. Device according to claim 2 in which one of the said pair of contacts which is mounted in a fixed relative position to the said pick-up arm consists of a strip of contact material mounted on the said pick-up arm essentially in a plane which contains the pick-up arm axis and the stylus point.

4. Device according to claim 3, in which the said strip of contact material is straight.

5. Device according to claim 3, in which the said strip of contact material is bent.

References Cited in the file of this patent

UNITED STATES PATENTS

| | | |
|---|---|---|
| 1,885,994 | Dieux | Nov. 1, 1932 |
| 2,585,396 | Martin | Feb. 12, 1952 |
| 2,915,315 | Rabinow | Dec. 1, 1959 |

FOREIGN PATENTS

| | | |
|---|---|---|
| 548,480 | Germany | 1932 |
| 372.317 | Great Britain | Apr. 29, 1932 |